Feb. 16, 1960   B. T. HENSGEN ET AL   2,925,269
STACKING DEVICE FOR STRIP MATERIAL
Filed Feb. 17, 1954   3 Sheets-Sheet 2

INVENTORS
Bernard T. Hensgen
James D. Ingle
BY
R. G. Story
ATTORNEY

Feb. 16, 1960   B. T. HENSGEN ET AL   2,925,269
STACKING DEVICE FOR STRIP MATERIAL
Filed Feb. 17, 1954   3 Sheets-Sheet 3

INVENTORS
Bernard T. Hensgen
James D. Ingle
BY
R. G. Story
ATTORNEY

United States Patent Office 2,925,269
Patented Feb. 16, 1960

2,925,269
STACKING DEVICE FOR STRIP MATERIAL

Bernard T. Hensgen and James D. Ingle, Chicago, Ill., assignors to Swift & Company, Chicago, Ill., a corporation of Illinois Application February 17, 1954, Serial No. 410,774

3 Claims. (Cl. 270—52)

The present invention relates generally to the production of cheese slices having relatively nonadhesive surfaces. More specifically, the present invention is directed to apparatus which may be utilized in carrying out the quick-chill process to produce cheese slices having relatively non-tacky surfaces.

In the production of packaged sliced cheese, the most important problem which the industry has had to overcome is that of producing sliced cheese which will not stick together when stacked and packaged. One of the suitable methods which has been devised to overcome this particular problem is that wherein the cheese is formed into a ribbon, of a thickness which is desired of the finished product, and quick-chilled by the use of suitable apparatus. The quick-chill has been normally accomplished by the use of a chill roll or refrigerated drum onto which molten cheese is deposited. The sudden chilling sets up the cheese and allows the formation of surfaces which are comparatively smooth. Much of the tackiness in cheese slices produced according to prior techniques has been attributed to the lack of obtaining smooth surfaces on the cheese slices. By the use of the quick-chill technique, the cheese sets up in a very short time and has little time to develop an unevenness along the surface or to conform with the unevenness of the surface onto which it is deposited.

Heretofore the quick-chill process has been carried out on equipment which is considered to be bulky and overcomplicated. In many instances the equipment has not been fully automatic in its operation. The apparatus utilized has required comparatively high expenditures in initial cost as well as in operation.

It is therefore an object of the present invention to set forth a particular type of apparatus, and modifications thereof, which has been found to be highly efficient in carrying out the quick-chill technique.

Another object is to set forth equipment of a fully automatic nature which carries sliced cheese production through all of the necessary operations without the use of complicated, bulky, or expensive equipment.

Another object is to provide apparatus capable of automatically stacking and slicing cheese ribbons.

Another object is to provide apparatus suitable for forming cheese ribbons which may be divided into cheese slices without the necessity of trimming.

Other objects not specifically set forth will become apparent from the following detailed description of the accompanying drawings wherein like reference numbers identify similar parts in the various figures.

Figure 1:
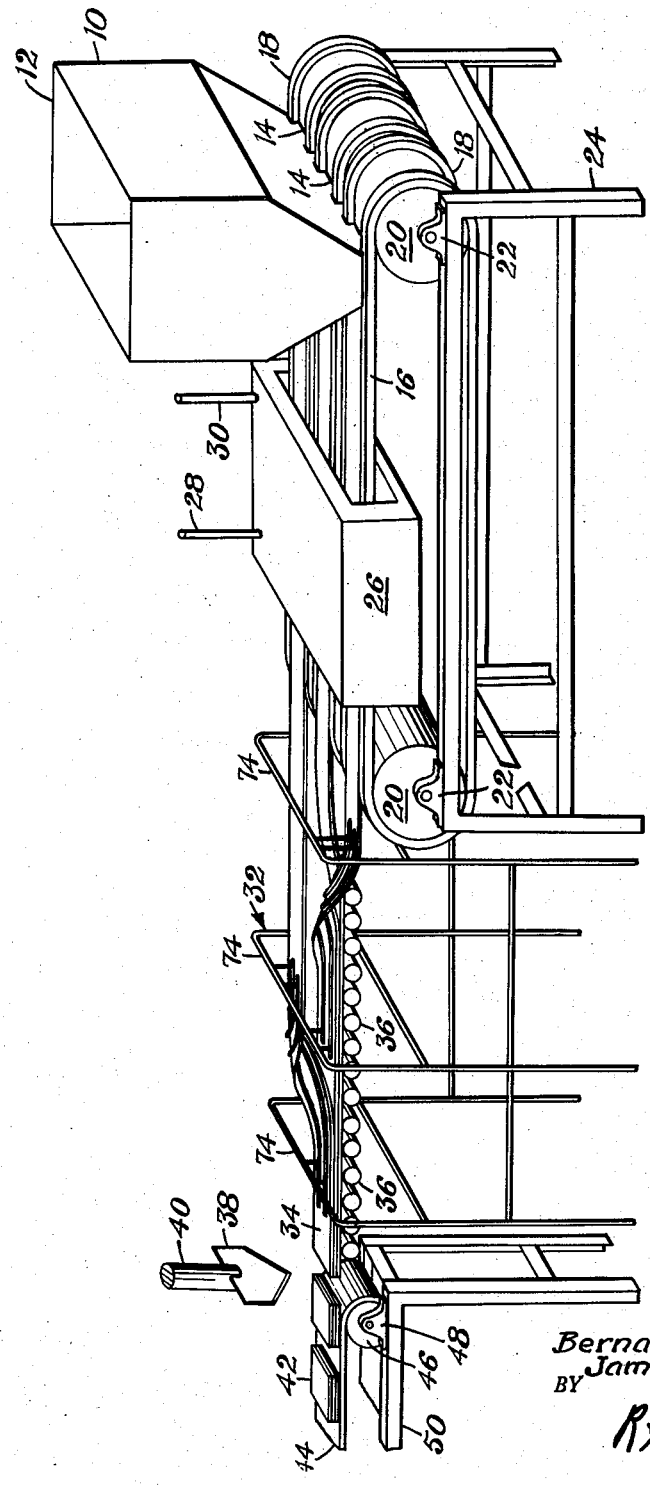
Figure 1 is an isometric view of one form of the apparatus of the present invention.

In Figure 1 hopper 10, having opening 12 and extruder orifices 14, is positioned directly over and near one end of conveyor belt 16. The belt 16 and the rollers 36, to be later described, form a continuous conveyor for supporting the cheese ribbons through the entire processing. The belt 16 is formed with ridges 18 at spaced intervals from one another. The ridges 18 forms between them depressions into which molten cheese from hopper 10 is delivered in the form of flat ribbons. Belt 16 is mounted on and driven by pulleys 20. These pulleys are held in position by bearings 22 which are positioned on frame 24. At a position removed from extruder 10 is mounted chill tunnel 26 which encases a portion of conveyor belt 16. Inlet 28 delivers coolant to chill tunnel 26 while outlet 30 removes the spent coolant therefrom. At the end of belt 16 is positioned stacking device 32 which will be described in detail in connection with Figure 3. Generally, the stacking device 32 receives the cheese ribbons from belt 16 and stacks them as shown at 34. These ribbons travel along rollers 36 while moving through stacking device 32. Upon the leaving of stacking device 32, the ribbons 34 are cut into sections by blade 38 mounted on reciprocating shaft 40 while being delivered onto conveyor 44. The sliced stacks 42 move along conveyor 44 to subsequent packaging operations. The conveyor 44 is mounted on and driven by pulley 46 which, in turn, is held by bearing 48 on frame 50.

The operation of the device shown in Figure 1 is as follows. Molten cheese is introduced into hopper 10 through the opening 12. The cheese is then delivered onto belt 16 and in the grooves thereof formed by the ridges 18 through the extruder orifices 14. The amount of cheese delivered is sufficient to fill the channels or grooves which are of a depth equivalent to the desired thickness of finished cheese slices. The ribbons of hot cheese formed in these grooves are carried by belt 16 through chill tunnel 26. In traversing the chill tunnel 26, the cheese ribbons set up and emerge as long ribbons of solid cheese. Just prior to leaving the belt 16, the cheese ribbons are picked up by the stacking device 32. The particular arrangement of the individual parts of the stacking device causes the cheese ribbons to be stacked one upon the other for subsequent slicing operations. Due to the solid nature of cheese upon its emergence from the chill tunnel 26, the ribbons are forced through the stacking device with the aid of rollers 36 which form a portion of the total conveyor. Rollers 36 support the cheese ribbons and allow them to be pushed through the stacking device. Upon emergence of the stacked cheese ribbons 34 from the stacking device 32, they are cut at spaced intervals by blade 38. At this point of the operation the individual cheese slices ready for packaging are thus formed. The cut stacks of cheese are pushed onto conveyor 44 which delivers them to the packaging operation. In Figure 1 the driving means for belt 16 and conveyor 44 are not shown as such means are of a conventional nature. It also should be noted that the driving means for the reciprocation of blade 38 is also not shown as this, too, may be conventional equipment.

Figure 2:
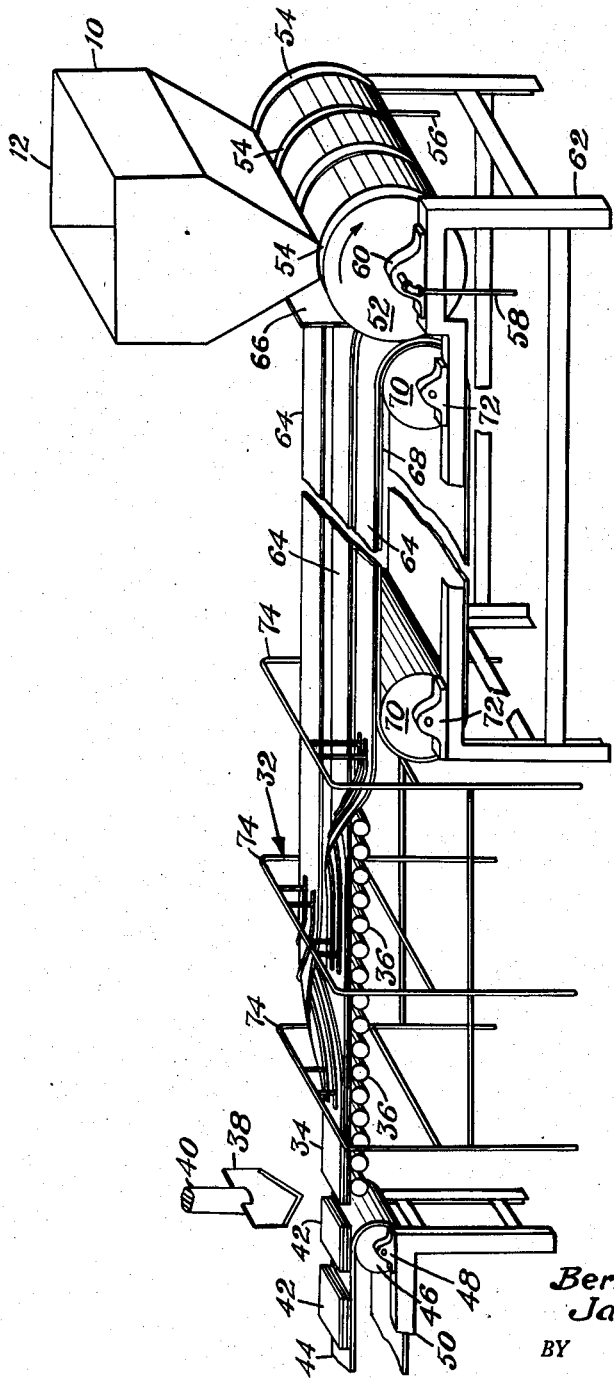
Figure 2 is an isometric view of a modified form of the apparatus of the present invention.

In Figure 2, a modification of the apparatus which constitutes the present invention is shown. Instead of the use of a ridged belt in this particular modification, a ridged chill roll 52 is utilized. In the operation of this device the molten cheese is introduced into hopper 10 through the opening 12 and delivered onto chill roll 52 into the channels formed by ridges 54. Here again the ridges are approximately the height of the desired thickness of cheese slices. Chill roll 52 contains an inlet 56 and an outlet 58 for the use of a coolant. The roll is positioned on frame 62 by means of bearing 60.

The roll 52 revolves in the direction of the arrow shown, and the cheese ribbons 64 are removed therefrom by stripper 66 and delivered onto belt 68 which, in conjunction with rollers 36, forms a portion of the total conveying means. The belt 68 is driven by pulleys 70 which are mounted on frame 62 by means of bearings 72. The cheese ribbons are delivered into the stacking device 32 in the same manner as shown in Figure 1. The ribbons emerge from stacking device 32 in a stacked condition as shown at 34, and are subsequently cut at spaced intervals by blade 38 mounted on shaft 40. The sliced cheese stacks 42 are then conveyed to a packaging device by means of conveyor 44 as previously described. Here again the driving means of chill roll 52, belt 68, conveyor 44, and blade 38 are not shown as they are conventional in the art.

Figure 3:
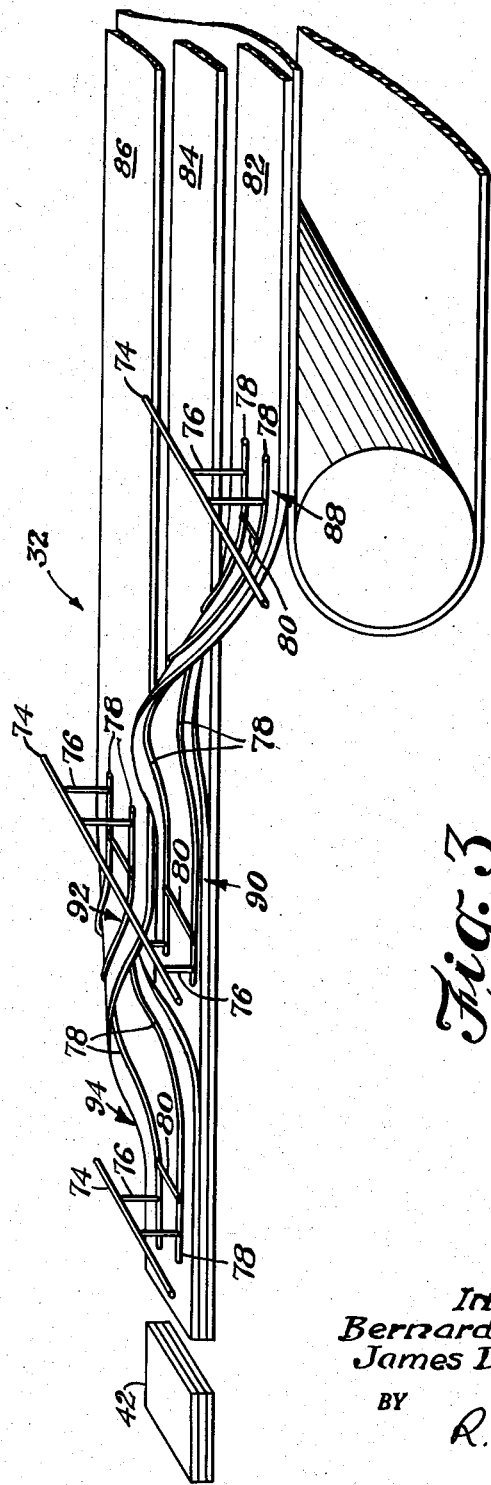
Figure 3 is an enlarged view of the stacking device utilized in conjunction with the apparatus of the present invention.

In Figure 3 the stacking device 32 is shown in detail. The device comprises frames 74, which are shown completely in Figures 1 and 2, onto which are mounted vertical members 76 which, in turn, support guides in the form of tracks 78, by carrying them in a suspended manner below frames 74. The guide tracks are spaced apart by track ties 80 and are twisted 180° along a portion thereof. The beginning of the 180° twist of the first track is shown by arrow 88, while the end of the 180° twist is shown by the arrow 90. The second guide track 180° twist begins at the point indicated by arrow 92, and the 180° twist is ended at 94.

In the operation of the stacking device, cheese ribbons 82, 84, and 86 are delivered into stacking device 32 from the conveyor belt as previously explained. The ribbons 82 and 86 enter between two parallel sets of guide tracks 78 and move between these tracks through the 180° twists as indicated by the arrows 88, 90, 92, and 94. Cheese ribbon 84 is conveyed along the rollers 36, shown in Figures 1 and 2, and becomes the bottom ribbon of the stack. As can be seen in Figure 3, ribbon 82 is twisted 180° and moved toward ribbon 84 to the middle ribbon of the stack. Ribbon 86 is twisted 180° and moved toward ribbon 84 to become the uppermost ribbon of the stack. As the stacked ribbons emerge from the stacking device 32 they are sliced as described in connection with Figures 1 and 2.

The belt 16 and chill roll 52 should be constructed of material that has a very smooth finish. This aids in the production of cheese slices having smooth surfaces, and cuts down the amount of tackiness which is present. In the operation of the chill tunnel 26 or chill roll 52 any suitable coolant may be utilized. If considered desirable, the particular apparatus may consist of built-in refrigerating units. The temperature of these quick-chill devices should be sufficient to cause the hot cheese to set up quickly. Due to the plastic nature of cheese the temperature change necessary to bring this about is not ordinarily too great but will vary dependent on the type of cheese treated. With respect to stacking device 32, the guide tracks and track ties should be formed from very smooth materials such as highly polished metal. Obviously, the number of ribbons of cheese made at the same time may be varied and the present apparatus should not be limited to apparatus of such a size as produces three ribbons only.

Cheese slices produced by the particular apparatus shown in the drawings contain substantially non-tacky or non-adhesive surfaces. These slices may be stacked and packaged without further treatment and subsequently may be readily separated when the package is opened. The ribbons formed do not require trimming or dimensioning of any form other than dividing by slicing into individual slices. Due to the channels formed by the ridges the width of each ribbon is uniform and no waste occurs due to the necessity of trimming.

The apparatus described can be operated automatically by the proper use of well-known automatic controls. The type of equipment utilized in the present invention is relatively simple in construction and low in cost. Its operation requires little supervision and is highly efficient. The apparatus is suitable for use with any flexible material and may be used in forming ribbons of plastics and the like.

Obviously, many modifications and variations of the invention as hereinbefore set forth may be made without departing from the spirit and scope thereof, and therefore only such limitations should be imposed as are indicated in the appended claims.

We claim:

1. A device for stacking ribbons of a given thickness of flexible material, said device including a conveyor having a conveying surface adapted to support ribbons of material in edge to edge relationship, power means connected to said conveyor to move said ribbons longitudinally in a given direction along a given path, and pairs of guides positioned in the path of movement of said ribbons, each of said pairs including guides extending generally parallel with respect to one another and separated from one another by a distance slightly exceeding the thickness of a ribbon, each of said pairs intercepting the path of movement of one of said ribbons and receiving one of said ribbons to move the ribbon in an original direction along a new path generally parallel to the path of movement of said conveyor, one of the guides of each pair being adjacent one surface of the ribbon and the other guide being adjacent the other surface of the ribbon, said pairs turning each ribbon 180° along its new path of movement and depositing each ribbon in superpositioned relationship with one another.

2. A device for stacking two ribbons of a given thickness of flexible material, said device including a conveyor having a conveying surface adapted to support a first and second ribbon of material in edge-to-edge relationship, power means connected to said conveyor to move said ribbons longitudinally in a given direction along a given path, and a pair of guides positioned in the path of movement of said second ribbon, said guides extending generally parallel with respect to each other and intercepting the movement of said second ribbon, said guides separated from each other by a distance slightly exceeding the thickness of said second ribbon, one end of said guides receiving said second ribbon to move the ribbon in an original direction along a given path generally parallel to the path of movement of said conveyor, one of said guides being adjacent one surface of said second ribbon and the other guide being adjacent the other surface of said second ribbon, the other end of said guides being turned 180° with respect to said first-mentioned end and removed from the original path of movement of said second ribbon to a new path of movement wherein said second ribbon is superpositioned with respect to said first ribbon.

3. A device for stacking two ribbons of a given thickness of a flexible material, said device including a conveyor having a conveying surface adapted to support a first and second ribbon of material in edge-to-edge relationship, power means connected to said conveyor to move said ribbons longitudinally in a given direction along a given path, and a pair of guides positioned in the path of movement of said second ribbon, said guides extending generally parallel with respect to each other and intercepting the movement of said second ribbon, said guides separated from each other by a distance slightly exceeding the thickness of said second ribbon, one end of said guides receiving said second ribbon to move the ribbon in an original direction along a given path generally parallel to the path of movement of said conveyor, one of said guides being adjacent one surface of said second ribbon and the other guide being adjacent the other surface of said second ribbon, the other end of said guides being constructed and arranged with respect to said first-mentioned end and removed from the original path of movement of said second ribbon to a new path of movement wherein said second ribbon is superpositioned with respect to said first ribbon.

References Cited in the file of this patent

UNITED STATES PATENTS

| | | |
|---|---|---|
| 302,042 | Smith | July 15, 1884 |
| 459,961 | Goss | Sept. 22, 1891 |
| 636,839 | Pecht | Nov. 14, 1899 |
| 801,577 | Firm | Oct. 10, 1905 |
| 836,552 | Allatt | Nov. 20, 1906 |
| 846,716 | Ashelm | Mar. 12, 1907 |
| 1,348,553 | Dowell | Aug. 3, 1920 |
| 1,452,379 | Haren | Apr. 17, 1923 |
| 1,776,353 | Dunbar et al. | Sept. 23, 1930 |
| 2,352,210 | Kraft | July 27, 1944 |
| 2,775,447 | Stirn et al. | Dec. 25, 1956 |